United States Patent [19]

Noding et al.

[11] Patent Number: 4,728,588

[45] Date of Patent: Mar. 1, 1988

[54] SECONDARY BATTERY

[75] Inventors: Stephen A. Noding, Brusly; Sanford A. Siegel, Baton Rouge, both of La.

[73] Assignee: The Dow Chemical Company, Midland, Mich.

[21] Appl. No.: 56,616

[22] Filed: Jun. 1, 1987

[51] Int. Cl.$^4$ .............................................. H01M 10/36
[52] U.S. Cl. ...................... 429/127; 429/162; 429/192; 429/194; 429/212
[58] Field of Search ............... 429/127, 162, 199, 192, 429/194, 212, 213; 252/182.1

[56] References Cited

U.S. PATENT DOCUMENTS

| | | | |
|---|---|---|---|
| 2,933,547 | 4/1960 | Grubb | 429/94 |
| 3,479,227 | 11/1969 | Gruber | 429/127 |
| 3,551,211 | 12/1970 | Grulke | 429/192 |
| 4,195,121 | 3/1980 | Peterson | 429/127 |
| 4,542,081 | 9/1985 | Armand et al. | 429/192 |
| 4,614,695 | 9/1986 | Ibbott | 429/127 |
| 4,620,026 | 10/1986 | Siegel | 560/85 |

FOREIGN PATENT DOCUMENTS 84107618.5  1/1985  European Pat. Off. .

Primary Examiner—Anthony Skapars
Attorney, Agent, or Firm—E. E. Spielman, Jr.; James M. Pelton

[57] ABSTRACT

This invention relates to a secondary battery comprised of a polymer film, and first and second collector plates. The polymer film comprises a polymer, a plasticizer for the polymer, an epoxidized vegetable oil, graphite and a salt disassociatingly solubilized by the plasticizer. The salt has the formula $MX_a$, wherein X is chloride, bromide or iodide, M is a metal ion having a reduction-oxidation potential greater than that of X and a is the oxidation number of M.

32 Claims, No Drawings 4,728,588

SECONDARY BATTERY

BACKGROUND OF THE INVENTION

This invention relates to a secondary battery comprised of a single polymer sheet which contains electrochemical species and which has a current collector on each of its two sides.

A secondary battery is most simply defined as a battery which can be recharged. This recharge capability is due to the incorporation, within the battery, of electrochemical reactants which undergo a highly reversible electrochemical reaction which converts chemical energy to electrical energy upon discharge of the battery. Recharging of the battery converts electrical energy to chemical energy. The electrochemical reactants can be identified as electrochemical species having either an anodic or cathodic state depending upon whether the battery is in the discharge or the recharge mode. The anodic state is identified with the oxidation half of the electrochemical reaction, while the cathodic state is identified with the reduction half of the electrochemical reaction.

During the discharge mode, the battery acts as a voltage device in which the difference in the electrochemical potential between its anodic electrochemical specie and its cathodic electrochemical specie serves as a driving force to supply electrons through a load connected to the battery. The electrons produced by oxidation of the anodic electrochemical specie pass from the battery's positive electrode, through the load and on to the battery's negative electrode. The battery's negative electrode is in association with the cathodic electrochemical specie. The acceptance of electrons by the negative electrode results in reduction of the cathodic electrochemical specie. When the potential difference between the battery's electrodes approaches zero volts, the source of electrons is substantially exhausted and the battery needs to be recharged.

During the recharge mode, the secondary battery behaves as an electrolysis device in which electrical energy is applied to the battery to provide the necessary electrons to convert the applied electrical energy into stored chemical energy. The electrochemical specie, which was anodic and served as a source of electrons during discharge, becomes cathodic during recharge and accepts electrons. The electrochemical specie which was cathodic during discharge becomes anodic during recharge. Although the roles of the battery's electrodes, i.e., the acceptance or the discharge of electrons, depends upon whether the battery is in the recharge or discharge mode, the positive electrode is always connected to the positive lead of the load. Similarly, the negative electrode is always connected to the negative lead.

Common secondary batteries are the alkaline and lead-acid batteries. These two types of batteries usually provide rigid cases in which the electrochemical specie are contained. Due to the requirements of the materials of construction, these batteries can have considerable thickness and weight. This is especially true of the lead-acid battery.

In an attempt to reduce the dimensions of secondary batteries, recent battery research has turned to the use of polymeric films in secondary batteries. See European patent application No. 84107618.5, June 30, 1984. The use of polymeric films can provide batteries having very thin cross-sections and decreased weight.

It is therefore an object of this invention to provide a novel secondary battery which incorporates the utilization of a single polymeric film and which, as a result, has a very thin cross-section even when constructed of a plurality of cells. It is also an object of this invention to provide a secondary battery which is flexible.

THE INVENTION

This invention provides a secondary battery which features a polymer film and first and second collector plates. The first collector plate is in electronic contact with one side of the polymer film and the second collector plate is in electronic contact with the other side of the polymer film. The polymer film is comprised of: a polymer; a plasticizer for the polymer; an epoxidized vegetable oil; a salt disassociatingly solubilized in the plasticizer and the salt has the formula $MX_a$ wherein X is: chloride, bromide or iodide; M is a metal ion having a reduction-oxidation potential greater than that of X; and a is the oxidation number of M.

The collector plates act to collect the electrons produced by the battery during discharge and to facilitate the application of a recharge voltage to the polymer film during recharge. The collector plates may be graphite, carbon cloth or of metal. When carbon cloth is used, a totally non-metal battery or system is achieved. When of metal, it is preferred that each collector plate be of the same metal. By having both collector plates of the same metal, electrolytic interaction between the plates is avoided. The metal collector plates are preferably foils of aluminum, copper, brass, platinum, silver or gold.

In a preferred form, the secondary battery of this invention is a laminate of the above-mentioned polymer film and collector plates. This laminate is constructed so that the polymer film is captured between the two collector plates. The resultant laminate can be held together mechanically or by the use of adhesive. The use of an adhesive requires that the adhesive be selected so that its electronic and ionic conductivity does not interfere with the operation of the secondary battery.

The $MX_a$ salt is preferably Zn, an alkali metal or an alkaline earth metal salt. Preferred of these are Li, Ca, Na, Zn and Mg. The halide constituent is preferably iodide as the use of chloride, bromide or fluoride results in a loss of these halides from the secondary battery due to their gaseous evolution therefrom. The selection of the M and X couple is, in all cases, such that the reduction-oxidation potential of M is greater than that for X. The difference in potential is preferably greater than 0.5 volts, as a smaller difference does not provide a battery voltage which would be useful to adequately power most present day devices. Salts exhibiting relatively high voltage output for the secondary battery of this invention are $CaI_2$ and LiI.

It is desirable to maximize the amount of salt which can be uniformly distributed within the polymer film. The maximization of the salt concentration is dependent upon the solubility of the salt in the plasticizer and upon the amount of plasticizer which can be used with the polymer without deleteriously affecting the latter's properties. To insure good solubility, the M constituent of the $MX_a$ salt should have a Pauling's electronegativity less than that for X by at least 0.1 units. Salt concentrations in the plasticizer within the range of from about 5% to about 30% of total salt saturation are deemed adequate to excellent for the purposes of this invention.

Besides the plasticizer being a good salt solvent, it has to also maintain its plasticizing function and be highly compatible with and able to maintain a continuous phase throughout the polymer. There are numerous plasticizers which may be used. Suitable plasticizers are exemplified by alkylene glycol alkanoic diesters and by alkylether esters of: benzoic acid; terephthalic acid; phthalic acid; and adipic acid. Preferred alkylene glycol alkanoic diesters have the formula:

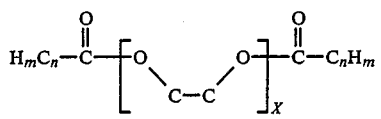

wherein X is a whole integer greater than or equal to 2 but less than or equal to 5, n is a whole integer greater than or equal to 4 but less than or equal to 12, and $m=2n+1$. Of this class of diesters, the compounds 2-ethylhexanoic tetraethylene glycol, 2-ethylheptanoic tetraethylene glycol, 2-ethylhexanoic triethylene glycol, 2-ethylheptanoic triethylene glycol, and mixtures thereof are especially preferred. These diesters are commercially available from C. P. Hall, Inc., of Chicago, Ill., and are marketed under the name of TEGMER. These plasticizers are suitably present in the polymer film in an amount of from about 30 to about 60 weight percent based upon the total weight of the polymer film.

A preferred plasticizer is an ether ester of terephthalic or adipic acid having the formula:

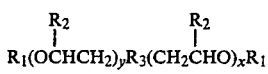

wherein $R_1$ is a phenyl radical or aliphatic hydrocarbon radical of the formula $C_nH_m$ wherein n is an integer of 1 through 8 inclusive and m is equal to $2n+1$; $R_2$ is either hydrogen or a methyl radical; $R_3$ is a terephthalate or adipate radical; x is 2, 3 or 4; and y is 2, 3 or 4. As a general rule, x and y will be equal. Satisfactory results are obtained, however, irrespective of whether x equals y. These ether esters can be produced by the methods disclosed in U.S. Pat. No. 4,620,026, which is incorporated herein by reference. The most preferred ether esters are di(triethylene glycol butyl ether)terephthalate and di(triethylene glycol butyl ether) adipate. When these particular terephthalates and adipates are utilized, they are preferably present in the polymer film in an amount within the range of from about 5 to about 50 weight percent based upon the total weight of the polymer film.

Preferred salt/plasticizer combinations are those in which the salt is $CaI_2$ or LiI and the plasticizer is a di(triethylene glycol butyl ether) ester of terephthalic or adipic acid.

Suitable as the polymer constituent of the polymer film are poly(vinyl chloride), polyurethane, polystyrene, chlorinated polyethylene, poly(vinylidene chloride), poly(ethylene terephthalate), chlorinated butyl rubber and isoprene/styrene/butadiene block copolymers. Both poly(vinyl chloride) and polyurethane are highly preferred. Polyurethane is especially preferred as it possesses adhesive qualities which will allow it to make good electrical contact with the collector plates.

The polymer films can have a thickness within the range of from about 0.1 to about 10 mils. The thinner polymer films, i.e., those polymer films having a thickness of from about 0.1 to about 1 mil, are preferred as these films provide higher discharge voltages. Further, the thinner films allow for the construction of multicell batteries having a total thickness which is sufficiently small so that a flexible battery is obtained.

As noted previously, the polymer film contains epoxidized vegetable oil. Exemplary of such are epoxidized linseed oil, epoxidized safflower oil, epoxidized soybean oil, epoxidized corn oil, epoxidized cottonseed oil and epoxidized rapeseed oil. Of these, epoxidized soybean oil is preferred. The epoxidized vegetable oil is generally present in the film in an amount within the range of from about 2 wt. % to about 10 wt. % based upon the total weight of the polymer film. A preferred amount is about 5 weight percent.

The polymer film may additionally contain various art-recognized processing aids. For example, solvents, such as, dimethylformamide, tetrahydrofuran, dipropylene glycol and methyl ether acetate, may be used when manufacturing the films of this invention by the solvent casting method. After casting, the solvents should be removed from the films to insure good battery performance. When other methods of film formation are used, other applicable conventional processing aids may be used so long as such do not interfere with the battery function of the polymer film.

The graphite component of the polymer film may be incorporated into the formulated compound used to produce the polymer film of this invention or, preferably, it can be present as a coating on the polymer film. If used as a coating, then it is applied by conventional techniques, e.g., brushing, spraying, etc.

When graphite is incorporated into the formulated compound, the average graphite particle size is preferably within the range of from about 0.5 to about 2.0 microns. The quantity of graphite used is dependent upon the thickness of the polymer film made from the compound. Generally, the thicker the polymer film, the greater the amount of graphite needed to maximize the voltage obtainable from the secondary battery at discharge. The thicker films, i.e., those of about 5 mils thickness or greater, need about 10 wt. % graphite, based upon the total weight of the polymer film. The graphite is preferably present in the thinner films, i.e., those from about 1.0 mil to about 3.0 mils thick, in an amount of from about 0.1 wt. % to about 0.5 wt. % with an amount of about 0.2 wt. % being highly preferred. In all cases, care needs to be taken that too much graphite is not present in a polymer film of a given thickness, as excessive graphite amounts can cause a short-circuit of the battery. Determination of the optimum graphite amount is dependent upon many variables and is best determined empirically.

When the graphite is used as a coating, the coat thickness should be within the range of from about 0.1 to about 10 microns. A preferred thickness is from about 1 to about 5 microns. Further, the graphite should be very fine, i.e., it should have an average particle size within the range of from about 0.1 microns to about 1.0 microns.

The polymer film of this invention can be prepared conventionally, such as by drawing, extrusion, by plastisol forming or by the solvent casting method. It has been observed that plastisol forming and the solvent casting method give best results. While drawn or extrusion films are operative, their discharge voltage capability is not equal to plastisol formed or solvent cast films. When the plastisol forming method is used, it is important to add the $MX_a$ salt to the plasticizer and then to add the resultant plasticizer/MXa salt solution as an ingredient to the rest of the formulated compound. With this manner of addition, higher salt solubilities are obtained and the formation of salt aggregates is avoided.

A feature of the secondary battery of this invention is that elevated temperatures are not required to achieve useful discharge voltages, but rather that the subject batteries can be conveniently discharged and recharged at ambient temperatures, e.g., 75° F. (25° C.).

There are at least two theories concerning the mechanism of operation for the secondary battery of this invention, though the invention is not limited thereto. One theory involves an oxidation-reduction route in which, during charging of the battery, the following electrochemical reactions are believed to be occurring:

$$M^{a+} + ae^- \rightarrow M° \qquad (I)$$

$$X_a^- \rightarrow aX_2 + ae^- \qquad (II)$$

At discharge, the following then occurs, $$2M° + X_2 \rightarrow M^+ + 2X^- \qquad (III)$$

Since the electrochemical reaction products (metal cation and halide anion) are the starting materials for reactions I and II, the battery can theoretically be infinitely recharged. Also, since the metal cations and the incipient metal are totally encapsulated in the polymer film, safety and assembly problems associated with lithium or other battery metals are minimized. During discharge, the halogen atom formed during recharge is highly mobile within the polymer matrix of the polymer film and is thus able to migrate to a position which is in close proximity to a metal atom formed by recharge and thus can enter into a reaction therewith to release an electron. (The reaction produces metal and halide ions, see Reaction III.) The released electrons migrate to the nearest collector plate which, during discharge, is on the cathode side of the battery. Migration of the electrons to the anode side of the battery is discouraged by the resistance offered by the thickness and the resistivity of the polymer film. The electrons collected on the cathodic collector plate can then be drawn off as a current. As the electrons are drawn off, a charge imbalance is present in the battery thereby causing the just formed metal ions to migrate to the anode side of the battery. The migration is believed to be made possible by the formation of a complex between the metal ions and the plasticizer. This process continues until the battery is discharged. Upon the application of a recharging current to the battery, the metal ions migrate back to the cathode/recharge anode side of the battery and are reduced to yield metal atoms. The halide ions migrate to the opposite side of the battery and are oxidized to yield the halogen atom. Thus, the battery is then charged and ready for the discharging sequence described above.

The other theory of operation involves an intercalation mechanism in which the Li cation is inserted between graphite layers on the cathode side of the battery. These graphite layers can be "staged", that is there can be both vacant layers and layers which are occupied by Li cations. On the anode side of the battery, the iodine is, according to the theory, intercalated in the graphite in a manner similar to the intercalation of the Li cations on the cathode side. The electromotive force of the battery is determined by the degree of charge transfer which takes place between the battery's two sides as electrons are lost or gained during the electrochemical process. Rechargeability of the battery depends on the reversibility of the insertion reaction. Rechargeability is favored when the structural differences between the intercalated compound and the intercalation host are small.

In support of the intercalation theory is the observation that the use of ion-insertion compounds in admixture with the graphite results in enhancement of battery function. Exemplary of ion-insertion compounds are titanium disulfide, vandium oxide, niobium trisulfide, vandium disulfide, manganese dioxide and tungsten trioxide. The ion-insertion compounds are preferably reduced and then mixed with the graphite to yield a uniform solid mixture prior to incorporation of the solid mixture in the battery.

Also supportive of the intercalation theory are the attempts to use in the battery some forms of carbon in place of the graphite. The resultant batteries were not satisfactory because, it is believed, the carbon forms used did not provide for intercalation. Other forms of carbon that were not tried may be useful if they provide the intercalation function.

It is also possible that the correct theory of operation for the battery of this invention may involve a combination of the oxidation-reduction mechanism and the intercalation mechanism.

EXAMPLE 1

In a dry box, a 400 ml beaker equipped with a magnetic stirring bar was placed on a magnetic stirrer/heater. To the beaker was added 12 g poly(vinyl chloride), 6 g of 2-ethyl hexanoic acid tetraethyleneglycol (TEGMER 804) 1 g epoxidized soybean oil, followed by the addition of 300 ml of dry N,N-dimethylformamide (DMF). After all of the components dissolved in the DMF, 2.5 g of lithium iodide (LiI) was added. The solution was stirred and heated for about one hour at 40°-50° C. The solution was then divided in half with each half poured onto a clear glass plate (25.4 cm × 25.4 cm × 1.27 cm) which had at least 0.64 cm high silcone rubber boundaries. The plates were first placed in an oven which had been nitrogen purged. The DMF solvent was allowed to evaporate at an oven temperature between 70° and 80° C. After at least 8 hours, the plates and film were placed in a vacuum oven at 30° C. and full vacuum for at least 8 hours. The plates were removed and placed in a box with a nitrogen atmosphere. Each of the films was cut in half and removed from the plates. A thin coating of 1 micron-size graphite particles was painted on one side of the film and then the other. The film with both sides so coated, was laid on top of a sheet of aluminum foil having an 18 gauge copper wire connected thereto. On the other side of the coated film, a like sheet of aluminum foil and wire was then laid. An insulating layer of SARAN film was then laid over the last sheet of aluminum foil to yield a laminate of aluminum sheet/film/aluminum sheet/SARAN film. The resultant laminate was then rolled, SARAN film to the inside, about a dowel to produce a roll which in turn was inserted and placed into an appropriate sized poly(- vinyl chloride) shrink tube. Heat was used to shrink the tube, thus forming a tight seal on the laminate with the cooper leads exposed, one on each end of the tube. One lead was attached to the anode of a DC power source and the other was attached to the cathode. A charge of ten volts was applied for the desired amount of time until the charging current decreased to 0.1 mA or less. The charged system was discharged through an appropriate resistor and the resultant voltage measured. The discharge voltage was initially 3.2 V at open circuit and 2.1 V through a 1K ohm resistor. The former discharge voltage was maintained for about 2 hours and then slowly decreased to 0.5 V over the next 8 hours. When the discharge voltage became zero, the system was then recharged as described above.

EXAMPLE 2

The procedure in Example 1 was followed except that 2.5 g of $CaI_2$ were substituted for the 2.5 g of LiI used in Example 1. The resultant open circuit discharge voltage was initially 2.8 V which decreased to 0.5 V over 2 hours. The resultant discharge voltage through the 1.0K ohm resistor was 1.5 V which decreased to 0.1 V over ½ hour.

EXAMPLE 3

The procedure in Example 1 was followed except that instead of 6 g, 8 g 2-ethylhexanoic acid tetraethyleneglycol were used to produce the polymer film. The resultant open circuit discharge voltage was initially 3.0 V and maintained over 1 hour. The resultant discharge voltage through a 1K ohm resistor was 1.86 V and slowly decreased to 0.5 V over the next 6 hours.

EXAMPLE 4

The procedure in Example 1 was followed except that instead of 2.5 g, 3.0 g LiI were used. The resultant open circuit discharge voltage was maintained at 3.0 V for 1 hour. The discharge voltage through a 1K ohm resistor was initially 2.86 V and slowly decreased to 0.5 V over an 8-hour period.

EXAMPLE 5

The procedure of Example 4 was followed except that instead of 3.0 g, 2.0 g LiI were used. The resultant open circuit discharge voltage was initially 2.9 V. The discharge voltage through a 1K ohm resistor was 2.55 V and slowly decreased to 0.3 V over the next 6 hours.

EXAMPLE 6

The procedure of Example 1 was followed except that conductive carbon cloth was used instead of aluminum foil and copper wire as the electrical contacts. This resulted in a non-metal battery after assembly and charging. The resultant open circuit discharge voltage was 2.5 V. The discharge voltage through a 1K ohm resistor was 1.75 V which slowly decreased to 0.5 V over 6 hours.

EXAMPLE 7

The procedure of Example 1 was followed except: instead of 12 g, 10 g of poly(vinyl chloride) and, instead of 2.5 g LiI, 2.5 g of $CaI_2$ were used; and the graphite was not used as a coating but instead was provided by adding 0.1 g of 1 micron size graphite to the polymer film producing solution. The initial open circuit discharge voltage was 1.865 V and the discharge voltage through a 1K ohm resistor was 0.052 V and slowly decreased to zero volts over 10 hours.

We claim:
1. A secondary battery which features:
   (a) a polymer film comprised of,
      (i) a polymer,
      (ii) a plasticizer for said polymer,
      (iii) an epoxidized vegetable oil,
      (iv) a salt disassociatingly solubilized in said plasticizer, said salt having the formula $MX_a$ wherein,
         X is chloride, bromide or iodide,
         M is a metal ion having a reduction-oxidation potential greater than that of X, and a is the oxidation number of M, and
      (v) graphite; and
   (b) first and second collector plates, said first collector plate being in electronic contact with one side of said polymer film and said second collector plate being in electronic contact with the other side of said polymer film.

2. The secondary battery of claim 1 wherein said battery is constructed as a laminate with said polymer film being the center lamina and said first and second collector plates being metal films and comprising the outside laminae.

3. The secondary battery of claim 1 wherein X is iodide.

4. The secondary battery of claim 1 wherein M is selected from the group consisting of Zn, alkali metals and alkaline earth metals.

5. The secondary battery of claim 1 wherein $MX_a$ is $CaI_2$.

6. The secondary battery of claim 1 wherein $MX_a$ is LiI.

7. The secondary battery of claim 1 wherein said plasticizer is an alkyl ether ester of an acid selected from the group consisting of benzoic acid, terephthalic acid, phthalic acid, adipic acid and mixtures thereof.

8. The secondary battery of claim 1 wherein said plasticizer is selected from the group consisting of: an alkyl ether ester having the formula,

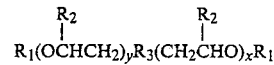

wherein $R_1$ is a phenyl radical or aliphatic hydrocarbon radical of the formula $C_nH_m$ wherein n is an integer of 1 through 8 inclusive and m is equal to $2n+1$, $R_2$ is either hydrogen or a methyl radical, $R_3$ is a terephthalate or adipate radical, x is 2, 3 or 4, y is 2, 3 or 4; and an alkylene glycol alkanoic diester of the formula,

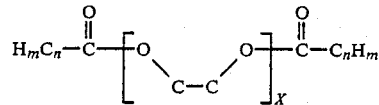

wherein X is a whole integer greater than or equal to 2 but less than or equal to 5, n is a whole integer greater than or equal to 4 but less than or equal to 12, and $m=2n+1$.

9. The secondary battery of claim 8 wherein said plasticizer is di(triethylene glycol butyl ether)terephthalate.

10. The secondary battery of claim 9 wherein said plasticizer is present in an amount within the range of from about 5 to about 50 weight percent based upon the total weight of said polymer film.

11. The secondary battery of claim 8 wherein said plasticizer is di(triethylene glycol butyl ether)adipate.

12. The secondary battery of claim 11 wherein said plasticizer is present in an amount within the range of from about 5 to about 50 weight percent based upon the total weight of said polymer film.

13. The secondary battery of claim 5 wherein said plasticizer is di(triethylene glycol butyl ether)terephthalate.

14. The secondary battery of claim 5 wherein said plasticizer is di(triethylene glycol butyl ether)adipate.

15. The secondary battery of claim 6 wherein said plasticizer is di(triethylene glycol butyl ether)terephthalate.

16. The secondary battery of claim 6 wherein said plasticizer is di(triethylene glycol butyl ether)adipate.

17. The secondary battery of claim 1 wherein said graphite is present as a coat on the sides of said polymer film and said coat has a thickness within the range of from about 0.1 microns to about 10.0 microns.

18. The secondary battery of claim 17 wherein said graphite has an average particle size within the range of from about 0.1 microns to about 1.0 microns.

19. The secondary battery of claim 1 wherein said polymer is selected from the group consisting of poly(vinyl chloride), polyurethane, polystyrene, chlorinated polyethylene, poly(vinylidene chloride), poly(ethylene terephthalate), chlorinated butyl rubber and isoprene/styrene/butadiene block polymers.

20. The secondary battery of claim 1 wherein said polymer is poly(vinyl chloride).

21. The secondary battery of claim 1 wherein said polymer is polyurethane.

22. The secondary battery of claim 1 wherein said epoxidized vegetable oil is epoxidized soybean oil.

23. The secondary battery of claim 22 wherein said polymer is poly(vinyl chloride).

24. The secondary battery of claim 23 wherein $MX_a$ is either $CaI_2$ or $LiI$.

25. The secondary battery of claim 24 wherein said plasticizer is di(triethylene glycol butyl ether)terephthalate or di(triethylene glycol butyl ether)adipate or mixtures thereof.

26. The secondary battery of claim 25 wherein said graphite has an average particle size within the range of from about 0.1 microns to about 1.0 microns and is present as a coat on the sides of said polymer film and said coat has a thickness within the range of from about 0.1 microns to about 10 microns.

27. The secondary battery of claim 8 wherein said plasticizer is 2-ethylhexanoic tetraethylene glycol, 2-ethylheptanoic tetraethylene glycol, 2-ethylhexanoic triethylene glycol, 2-ethylheptanoic triethylene glycol or mixtures thereof.

28. The secondary battery of claim 27 wherein said plasticizer is present in an amount within the range of from about 30 to about 60 weight percent based upon the total weight of said polymer film.

29. The secondary battery of claim 5 wherein said plasticizer is 2-ethylhexanoic tetraethylene glycol, 2-ethylheptanoic tetraethylene glycol, 2-ethylhexanoic triethylene glycol, 2-ethylheptanoic triethylene glycol or mixtures thereof.

30. The secondary battery of claim 6 wherein said plasticizer is 2-ethylhexanoic tetraethylene glycol, 2-ethylheptanoic tetraethylene glycol, 2-ethylhexanoic triethylene glycol, 2-ethylheptanoic triethylene glycol or mixtures thereof.

31. The secondary battery of claim 24 wherein said plasticizer is 2-ethylhexanoic tetraethylene glycol, 2-ethylheptanoic tetraethylene glycol, 2-ethylhexanoic triethylene glycol, 2-ethylheptanoic triethylene glycol or mixtures thereof.

32. The secondary battery of claim 31 wherein said graphite has an average particle size within the range of from about 0.1 microns to about 1.0 microns and is present as a coat on the sides of said polymer film and has a thickness within the range of from about 0.1 microns to about 10.0 microns.

* * * * *